(12) United States Patent
Keim et al.

(10) Patent No.: US 8,002,551 B2
(45) Date of Patent: Aug. 23, 2011

(54) LANGUAGE SKILLS TEACHING METHOD AND APPARATUS

(75) Inventors: Gregory Keim, Broadway, VA (US); Jack August Marmorstein, Harrisonburg, VA (US); Ronald Bryce Inouye, Harrisonburg, VA (US); John Fairfield, Bridgewater, VA (US); Michael Scott Fulkerson, Harrisonburg, VA (US)

(73) Assignee: Rosetta Stone, Ltd., Arlington, VA (US)

( * ) Notice: Subject to any disclaimer, the term of this patent is extended or adjusted under 35 U.S.C. 154(b) by 486 days.

(21) Appl. No.: 12/329,134

(22) Filed: Dec. 5, 2008

(65) Prior Publication Data

US 2010/0143874 A1    Jun. 10, 2010

(51) Int. Cl.
*G09B 5/00* (2006.01)
(52) U.S. Cl. ........ 434/169; 434/156; 434/157; 434/167; 434/185
(58) Field of Classification Search .................. 434/156, 434/157, 167, 169, 185; 704/3, 270, 271
See application file for complete search history.

(56) References Cited

U.S. PATENT DOCUMENTS

| 6,077,085 A | * | 6/2000 | Parry et al. | 434/322 |
| 7,407,384 B2 | * | 8/2008 | Raya et al. | 434/167 |
| 2007/0015121 A1 | * | 1/2007 | Johnson et al. | 434/156 |

* cited by examiner

*Primary Examiner* — Xuan Thai
*Assistant Examiner* — Randall N Crenwelge
(74) *Attorney, Agent, or Firm* — Sorin Royer Cooper LLC

(57) ABSTRACT

A student providing a multi-word response in a computerized language teaching system provides a manual input concurrently with each responsive word. For example, he might enter a keystroke correspondent to the first letter of each word. When using the teaching computer silently, a student will typically "speak" each word mentally as he enters a keystroke, so the limited experience is almost as effective as speaking out loud. When a student types one or more keystrokes concurrently with each word that he speaks, the computer will be able to detect when a student is responding with a correct word, but merely mispronouncing it. Also, since the computer will receive a keystroke as the student starts each new word, it is better able to distinguish the boundaries between words and recognize them more reliably.

11 Claims, 2 Drawing Sheets

LANGUAGE SKILLS TEACHING METHOD AND APPARATUS

BACKGROUND OF THE INVENTION

The present invention relates generally to teaching methods and apparatus and, more particularly, concerns a teaching method and apparatus which permit manual responses to language queries, in order to facilitate silent language study while also allowing quasi verbal practice by a language learner. The invention also provides a manner in which to assist a speech recognizer is recognizing spoken words.

A common way of teaching foreign languages is through interaction with a computerized teaching program. Typically, interaction is carried out in the language being taught. The computer will interrogate the student verbally and, after receiving his verbal response, judge it for correctness of language usage and pronunciation. Based on the student's performance, the computer can then adapt its presentation.

An example of such a system is described in copending application Ser. No. 12/052,435 entitled "Adaptive Recall" ("the '435 application") owned by the assignee of the present invention. The '435 application is incorporated herein by reference.

A number of problems arise in this type of teaching system. Several of such problems are addressed by the present invention. First of all, the student may be working in an environment in which audible responses may not be possible or convenient, for example, in a library, while traveling on public transportation, or in a noisy environment. In such cases, an audible response might disturb others or be masked by an environmental noise. Of course, the student could present a written response, but his involvement with correct spelling will interfere with the flow of the response, and the quality of his pronunciation is not easily tested.

Another problem that arises when a student provides a multi-word answer is that the teaching computer may have difficulty distinguishing between the utterance of an incorrect word and the mispronunciation of a correct word in a student's verbal response. Similarly, the student may run his words together in a verbal response, and the teaching computer may therefore have difficulty recognizing the words.

It is an object of the present invention to provide solutions to one or more of the foregoing problems.

SUMMARY OF THE INVENTION

In accordance with the present invention, a student providing a multi-word response in a computerized language teaching system provides a manual input concurrently with each responsive word. For example, he might enter a keystroke correspondent to the first letter of each word. When using the teaching computer silently, a student will typically "speak" each word mentally as he enters a keystroke, so the limited experience is almost as effective as speaking out loud.

Preferably, but not necessarily, the manual input method will consist of a single action, such a single keystroke that may consist of entering the first letter of the word to be input.

Furthermore, when a student types one or more keystrokes concurrently with each word that he speaks, the computer will be better able to distinguish between the cases when a student is responding with a correct word, but merely mispronouncing it, and when a student is responding with the incorrect work in the target language.

Also, since the computer will receive a keystroke as the student starts each new word, it is better able to distinguish the boundaries between words and recognize them more reliably.

BRIEF DESCRIPTION OF THE DRAWINGS

The foregoing brief description, and further objects, features, and advantages of the present invention will be understood more completely from the following detailed description of a presently preferred, but nonetheless illustrative, embodiment in accordance with the present invention, with reference being had to the accompanying drawings in which.

DETAILED DESCRIPTION OF THE PREFERRED EMBODIMENT

Figure 1:
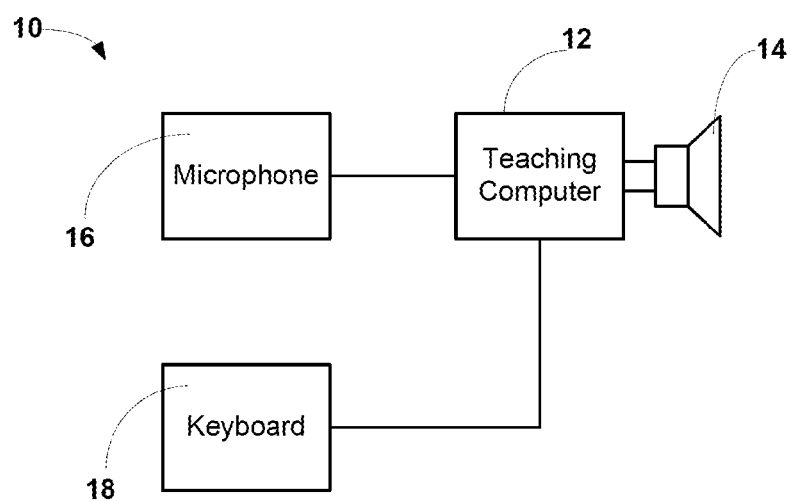
FIG. 1 is a functional block diagram illustrating a language skills teaching system 10 embodying the present invention.

Turning now to the drawings, FIG. 1 is a functional block diagram illustrating a language skills teaching system 10 embodying the present invention. Preferably, a teaching computer 12 is programmed to teach a foreign language. Typically, the computer will be programmed with all the multimedia information necessary to teach an entire course. This would include a collection of verbal queries that are presented to the student through a speaker 14. Alternatively, or in addition, the queries could be present in a display incorporated into the teaching computer. A microphone 16 is provided, through which a student may provide verbal answers to computer 12. A keyboard 18, or the like, is provided, through which a student may also communicate with computer 12.

In operation, computer 12 presents a sequence of queries to the student in the language being taught. The queries may, in addition, be presented on a display which is part of computer 12, or audible queries may be produced via speaker 14. In response to a query, the student speaks a multi-word response into a microphone 16. The queries are such that the computer will know exactly what it is to expect as a correct response.

Concurrently with the spoken words, the student types on a keyboard 18. Preferably, each keyboard entry corresponds to the first letter of the word being spoken. After the student responds to a query, computer 12 may continue to present additional queries, depending upon the student's previous responses. The student will, similarly, respond to the additional queries, and the course of the presentation will be adapted in relationship to the student's performance.

The teaching computer 12 may also be a small hand-held device such as a Blackberry® or the like. These devices have miniature keyboards, or other manners in which to easily designate the first letter of each word.

Figure 2:
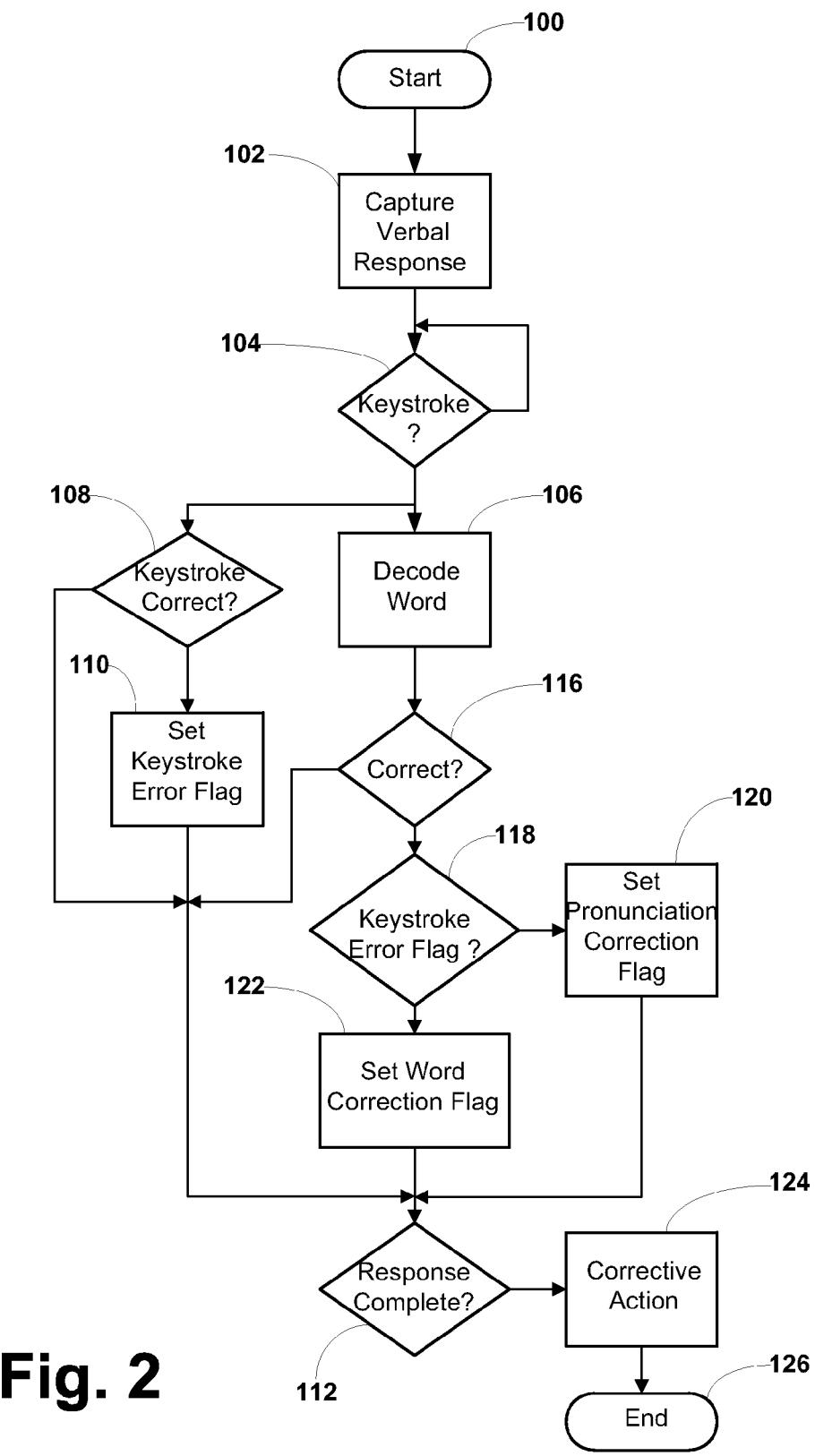
FIG. 2 is a flow chart illustrating a preferred language skills teaching method embodying the present invention.

FIG. 2 is a flow chart illustrating a preferred language skills teaching method embodying the present invention in which both the keystroke and verbal response are combined. The process starts at block 100 after the teaching computer has issued a query and, at block 102, a verbal response from the student is captured. At block 104, a keystroke is awaited and, when it is detected, the word constituting the verbal response is decoded at block 106.

Simultaneously, a test is performed at block 108 to determine whether the received keystroke was correct; that is, whether it corresponds to the expected next responsive word from the student. In the preferred embodiment, the correct keystroke corresponds to the first letter of the expected word. However, it is also contemplated that a keystroke could correspond to a plurality of letters at the beginning of the expected word. If the keystroke is not correct, if a keystroke error flag is recorded for that word at block 110, and control is transferred to block 112. On the other hand, if it is determined at block 108 that the keystroke was correct, control is transferred to block 112.

Once the word has been decoded at block 106, a test is performed at block 116 to determine whether the student has spoken the correct word. If he has, control is transferred to block 112. On the other hand, if it is determined at block 116 that the student has not spoken the correct word, a test is performed at block 118 to determine whether there is a keystroke error flag for this word. If not, it is concluded that the student has merely mispronounced the correct word, a pronunciation correction flag is generated for that word at block 120, and control is transferred to block 112.

On the other hand, if it is determined at block 118 that a keystroke error flag exists for this word, it is concluded that the student has responded with the wrong word, a word correction flag is generated for that word at block 122, and control is transferred to block 112.

At block 112, a test is performed to determine whether the student has provided a complete response, that is, whether he has responded with the number of words expected. If not, control is reverts to block 102 for the capture of further responses from the student. On the other hand, if the student has provided a complete response, control transfers to block 124, where the teaching computer provides corrective action.

At blocks 120 and 122, pronunciation and word correction flags were stored in association with the words of the response. These flags will control the corrective action taken at block 124. That is, the student will be notified of incorrect and mispronounced words, and for the training will be provided with respect to such words as the teaching program progresses. Of course, if the student has provided an entirely correct response, the teaching program can continue as originally scheduled.

In another embodiment, there is no speech at all. The responses are measured solely from the manual input, and the system relies upon the fact that users typically mentally "speak" the word corresponding to the first letter they are entering manually.

From the preceding description, it will be appreciated that the teaching process in accordance with the present invention offers an excellent opportunity for a student to receive language skills training—even "speech" practice—when the environment does not permit audible responses. The silent mental or mouthed "speech" accompanying a keystroke still provides excellent language training.

Furthermore, when the student does offer audible responses, the presence of a concurrent keystroke provides a vehicle for determining whether the student has mispronounced a responsive word or merely responded incorrectly. At the same time, the presence of the keystroke defines the window tongue which the teaching machine can perform word recognition. Providing such a window to estimate the time boundaries of the word will substantially improve the reliability of its recognition.

In a mixed embodiment, the system can transparently operate in either mode. Specifically, the system can process the manual input while checking for audible input. If only manual input is available, the system can still conduct the language lessons, checking for appropriate responses, adapting its curriculum, and performing all other actions of the language learning program. However, when the system detects a substantially simultaneous input of response via manual and verbal methods, the system may utilize both as described above.

Although a preferred embodiment of the invention has been disclosed for illustrative purposes, those skilled in the art will appreciate that many additions, modifications, and substitutions are possible without departing from the scope and spirit of the invention as defined by the accompanying claims.

What is claimed:

1. A method for teaching a student a target language comprising:
   presenting, on a display of a computer system, a query to the student requiring a response in the form of a sequence of responsive words in the target language and a series of physical responses;
   accepting, via the computer system, a responsive sequence from the student made up of a spoken sequence of words in the target language and a single physical response corresponding to each word of the sequence of the responsive words; and
   comparing, by the computer system, the responsive sequence to the sequence of responsive words and the series of physical responses to determine if a correct input was given;
   wherein the physical response is a key activation on an input device of said computer system.

2. The method of claim 1 further comprising concluding that a word has been mispronounced when a spoken word fails to conform to the corresponding word of the sequence of responsive words, while the comparing step reveals that the physical response for the corresponding word of the sequence of responsive words was correct.

3. The method of claim 1 further comprising concluding that a students response to corresponding to a word in the sequence of responsive words is incorrect when a spoken word fails to conform to the corresponding word of the sequence of responsive words, and the comparing step reveals that the physical response for the corresponding word of the sequence of responsive words was incorrect.

4. The method of claim 1 further comprising inputting timing information of each physical response into a speech recognition algorithm in association with the corresponding word of the sequence of responsive words, to assist said speech recognition algorithm in ascertaining time boundaries of spoken words.

5. A method for teaching a target language to a student:
   presenting, on the display of a computer system, a query to the student requiring a response in the form of a responsive multiword phrase of words in the target language and a series of physical responses;
   accepting via the computer system, from said student a sequence of single actions, each single action being potentially representative of a respective word in the multiword phrase;
   accepting, via the computer system, from the student spoken input as a response to the query;
   comparing, by the computer system, words in the multiword phrase to portions of said spoken input based upon timing information derived from said sequence of single actions; and
   outputting, by the computer system, a signal indicative of whether said user provided a proper response, wherein the physical response is a key activation on an input device of said computer system.

6. The method of claim 5 wherein the timing information is derived by signaling a start of a new word substantially at the time of input of said single action corresponding to each word.

7. An apparatus for teaching a target language to a student comprising:
- a query generator presenting a query to the student requiring a response in the form of a sequence of responsive words in the target language and a series of physical responses;
- an input device operated by the student to produce a responsive sequence made up of a single physical response, in the form of a key activation of the input device, corresponding to each word of the sequence of the responsive words;
- a second input device programmed to accept spoken words from the student potentially corresponding to the words of the sequence of responsive words;
- a comparator comparing the responsive sequence to the sequence of responsive words to determine if a correct input was given;
- a second comparator programmed to compare each spoken word to respective words of the sequence of responsive words, and mispronunciation sensor jointly responsive to non- comparison in the second comparator and a comparison in the first comparator to indicate mispronunciation of the respective word in the sequence of responsive words.

8. The apparatus of claim 7 wherein the input device is a keyboard.

9. An apparatus for teaching a target language to a student comprising:
- a query generator presenting a query to the student requiring a response in the form of a sequence of responsive words in the target language and a series of physical responses;
- a first input device programmed to be operated by the student to produce a sequence of single actions, in the form of a key activation, each single action being potentially representative of a respective word in the multi-word phrase;
- a second input device programmed to accept from the student spoken input as a response to the query;
- a comparator comparing words in the multiword phrase to portions of said spoken input based upon timing information derived from said sequence of single actions.

10. The apparatus of claim 9 wherein the timing information is derived by signaling a start of a new word substantially at the time of input of said single action corresponding to each word.

11. The apparatus of claim 9 further comprising a further comparator comparing each single action to the respective word in the sequence of responsive words, to indicate a comparison when the single action and respective word compare, and a mispronunciation indicator responsive a successful comparison in the further comparator and a failure to compare in the comparator, to indicate that the respective word has been mispronounced by the student.

\* \* \* \* \*